United States Patent [19]
Minhas

[11] Patent Number: 4,874,405
[45] Date of Patent: Oct. 17, 1989

[54] COUPLING FLUID SEPARATION MEMBRANE ELEMENTS

[75] Inventor: Bhupender S. Minhas, Columbia, Md.

[73] Assignee: W. R. grace & Co.-Conn., New York, N.Y.

[21] Appl. No.: 310,429

[22] Filed: Feb. 14, 1989

[51] Int. Cl.$^4$ ............................................. B01D 13/00
[52] U.S. Cl. ......................................... 55/158; 55/68; 55/73; 55/485; 55/513
[58] Field of Search ................... 55/16, 68, 23, 158, 55/482, 485, 501, 578; 210/335, 354, 321.74, 321.84, 497.1; 55/513

[56] References Cited

U.S. PATENT DOCUMENTS

| | | | |
|---|---|---|---|
| 3,870,636 | 3/1975 | Schettler | 210/235 X |
| 4,016,083 | 4/1977 | Sakaguchi et al. | 210/433.2 |
| 4,134,742 | 1/1979 | Schell | 55/16 |
| 4,352,736 | 10/1982 | Ukai et al. | 55/158 X |
| 4,517,085 | 5/1985 | Driscoll et al. | 210/232 |
| 4,746,430 | 5/1988 | Cooley | 210/321.85 |
| 4,808,199 | 2/1989 | Yearout | 55/16 |

*Primary Examiner*—Charles Hart
*Attorney, Agent, or Firm*—David E. Heiser; Vincent L. Fabiano; William W. McDowell, Jr.

[57] ABSTRACT

An improved method is disclosed for coupling membrane elements of a fluid separation module in series. The improvement comprises providing flexible coupling members having two open ends and a passage between said ends; and securing the first end of a coupling member to the residual end of each membrane element (with the optional exception of the last in the series) and securing the second end of the coupling member to the feed end of the next membrane element in the series if any. Fluid from the residual end of each membrane element except the last may thus be directed to the feed end of the next membrane element. An improved fluid separation module employing such couplings is disclosed; as is an improved membrane element having a coupling member secured thereto.

8 Claims, 4 Drawing Sheets

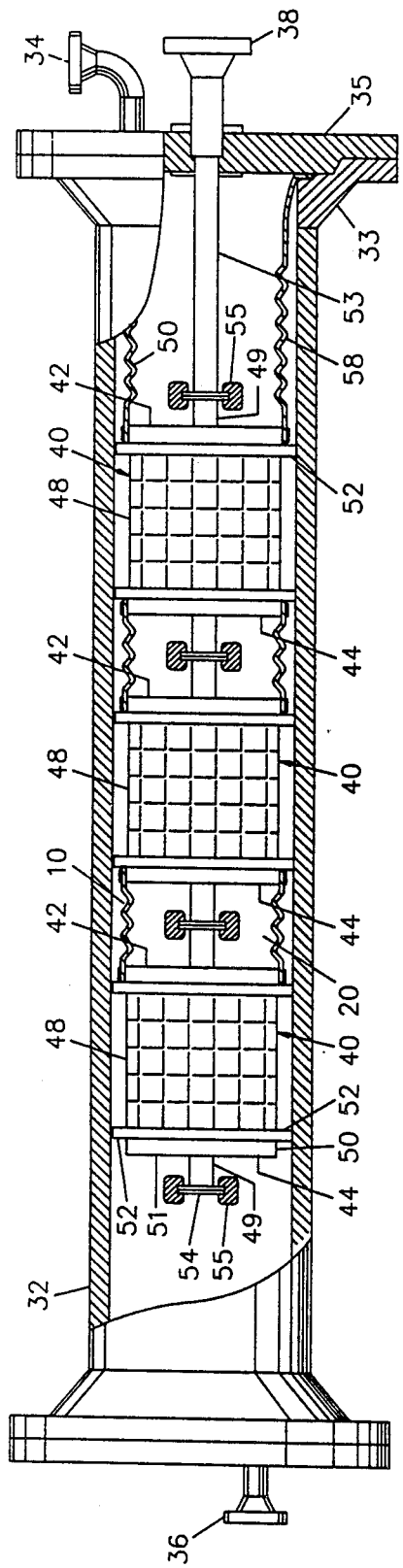
FIG. 4
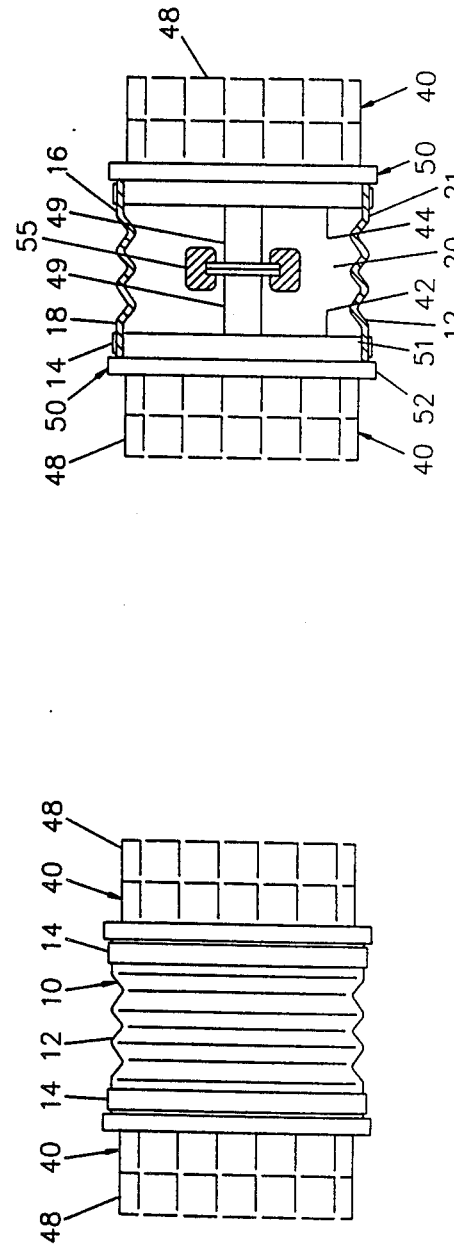
FIG. 6
FIG. 5

COUPLING FLUID SEPARATION MEMBRANE ELEMENTS

SUMMARY OF THE INVENTION

This invention relates to fluid separation membranes, and more particularly, to means for coupling fluid separation membrane elements in series.

BACKGROUND OF THE INVENTION

The use of membranes for fluid separation is becoming increasingly more common. In these systems, a fluid mixture under relatively high pressure is passed across the surface of a membrane adapted to act as a selective barrier, permitting some components of the fluid composition to pass through more readily than others. The separation of gases in membrane separation processes is generally due to molecular interaction between the gaseous components of the feed stream and the membrane. Because different components interact differently with the membrane, their permeation rates through the membrane are different, and substantial separation of components can be effected. While a selective effect can result from free molecular diffusion through membrane pores, especially in applications where small gas molecules such as hydrogen and helium are components of a gas mixture, membrane separation is often considered to proceed principally by the sorption of a gaseous component on the feed side of the membrane, diffusion of that component through the membrane, and desorption of the component from permeate side of the membrane. Membranes used for gas separation processes wherein the separation mechanism is controlled principally by solubility and diffusivity, as opposed to free molecular diffusion, are classified as nonporous membranes. While these nonporous membranes may in fact have small "pores", they are typically produced in a carefully regulated manner to provide a dense layer which effectively controls the gas transfer in the system. The structure of this dense control layer is often crucial to membrane performance, and it can be adversely affected by such factors as moisture, chemical degradation, or physical deformation.

Gas transfer through nonporous membranes is dependent upon variables such as membrane surface area, the pressure differential across the membrane, the diffusion rate of the gaseous components, and the effective thickness of the membrane. Generally, the membrane layer through which the gases must diffuse should be as thin as possible in order to obtain the maximum rate of gaseous diffusion. However, the membrane thinness is limited by a need to have a membrane free from defects, such as pinholes, and the need to have a membrane which has the physical integrity to withstand pressure differences sometimes as high as about 4,000 pounds per square inch (psi) across the membrane. For example, asymmetric cellulose ester membranes can be produced which do have a very thin but dense (nonporous) layer and a supporting sublayer of larger pore size. The thin dense layer basically controls the mass transfer in the system, and the thicker sublayer provides a degree of structural integrity. Many types of membranes, including cellulose esters and polymeric membranes, such as silicate rubber, polyethylene and polycarbonate, may be employed in gas separation. However, the particular membrane used can depend upon the separation sought to be effected.

Commercial gas separation processes are generally continuous operations in which a feed gas stream is brought into contact with the feed side of a membrane. The pressure on the feed side of the system is maintained at a pressure sufficiently higher than the pressure on the permeate side of the membrane to provide a driving force for the diffusion of the most permeable components of the gaseous mixture through the membrane. The partial pressure of the more permeable gaseous components is also maintained at a higher level on the feed side of the membrane than on the permeate side by constantly removing both the permeate stream and the residue of the feed stream from contact with the membrane. While the permeate stream can represent the desired product, in most gas permeation processes the desired product is the residue stream, and the permeate stream consists of contaminants which are removed from the feed stream.

For example, $CO_2$ and $H_2S$ can be removed from a hydrocarbon mixture, such as natural gas, using a thin dried supported cellulose ester membrane, and a differential pressure across the membrane of about 100 psi. The partial pressures of $CO_2$ and $H_2S$ in the permeate stream are preferably kept at about 80 percent or less of the partial pressure of those same components in the feed stream by separately and continuously removing the depleted feed gas (residue) stream and the permeate stream from contact with the membrane. The residue stream can, of course, be fed to another gas separation membrane stage to further reduce the concentration of $CO_2$ and $H_2S$, and the permeate gas stream can likewise be fed to another separation stage to produce a product having a still higher concentration of the more permeable products $CO_2$ and $H_2S$. In fact, the use of multiple separation steps in series and/or in parallel offers considerable diversity in separation alternatives using membrane technology so long as sufficient pressures can be maintained in the system.

Spiral wound membrane arrangements are commonly used in commercial fluid separation processes. An advantage of using a spiral wound technique is that this affords a large membrane contact area while permitting a rather small overall containment vessel. A standard way of supplying spiral wound membranes for commercial use is in the form of membrane elements which comprise a section of permeate conduit around which the membrane is wound. These membrane elements may then be used singly or joined together in series by interconnecting their permeate conduit sections. The usual way to use spiral wound membrane elements is to contain them, either singly or multiply in containment vessels to form fluid separation modules. The modules can then in turn be used singly or can be conveniently interconnected in series or parallel arrangements to provide the desired treatment.

When multiple membrane elements are used in series within a single module, it is desirable to seal each element from the other so as to inhibit the bypass of elements and the mixing of the respective feed fluids for the respective element. This is commonly accomplished by using a gasket or seal (e.g. U-cup seals) which seal the outer wrap of the element to the inner wall of the module containment vessel. The effectiveness of these seals depends on such factors as the type and condition of the seal material, and the surface of both the outer wrap of the element and the inner wall of the containment vessel. Thus membrane performance can be adversely affected by such factors as degraded seals and- /or course-surfaced containment vessel walls. Moreover U-cup seals are typically designed to seal more firmly against the surfaces they address as the pressure drop across the seal increases. Inasmuch as the pressure drop across each membrane element is normally modest, there is some difficulty in providing U-cup seals which provide optimum sealing under the pressure drop conditions ordinarily encountered between two adjacent membrane elements in a series.

SUMMARY OF THE INVENTION

An improved method has been found for coupling fluid separation membrane elements in series for use within a common containment vessel. The method employs a flexible coupling member having an open first end, an open second end and a passage between the first and second ends having walls which are essentially impervious to the fluid mixture being treated. Means are provided for securing the respective ends of the flexible coupling member between sequential membrane elements such that fluid from the residual end of one membrane element is directed to the feed end of the next membrane element. An improved fluid separation module employing such couplings is disclosed; as is an improved spiral wound membrane element having a flexible coupling member secured thereto.

An object of this invention is to provide for coupling of fluid separation membrane elements in series in a manner which inhibits fluid bypass of membrane elements in the series.

Another object of this invention is to provide fluid separation module with an improved seal between the feed fluid to the module and the residual fluid from the module.

These and other objects and advantages of the present invention will become apparent from the following detailed description of the invention.

BRIEF DESCRIPTION OF THE DRAWINGS

In the drawings:

FIG. 4 is a further section view of the separation apparatus of FIG. 2 showing the permeate tubes of adjacent membranes elements joined within the couplings.

FIG. 5 is a detailed view of a coupling between adjacent membrane elements of FIG. 3.

FIG. 6 is a partially sectioned view of FIG. 5, showing the permeate tubes of the membrane elements joined within the coupling.

DESCRIPTION OF THE PREFERRED EMBODIMENT

Figure 9:
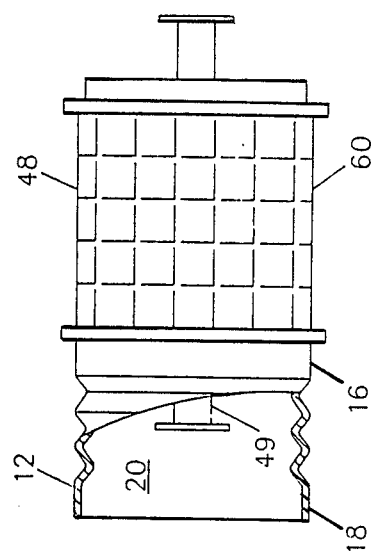
FIG. 9 is a partially sectioned view of a membrane element having a coupling secured thereto in accordance with this invention.

An improved method has now been found for coupling together a series of membrane elements used to separate fluids in a fluid composition. The series of at least two membrane elements may then be used within a common containment vessel to provide an improved fluid separation module. Generally, each membrane element is positioned within the containment vessel and has a feed end wherein fluid passes into the membrane element and a residual end wherein residue passes from the membrane element. The first membrane element in the series receives the feed fluid to the series, and the last membrane element in the series discharges the residual fluid from the series, while the residual fluid from each membrane element in the series except the last is fed to the next membrane element in the series. The permeate from the series of membrane elements is separated from the residual as the fluid passes through the series. The improvement may be used in liquid separation systems such as reverse osmosis, ultrafiltration, microfiltration and pervaporation systems. A preferred use of the coupled membranes of this invention is for separating gases in a mixture of feed gases. The improvement comprises the steps of: (a) providing a flexible coupling member for each membrane element with the optional exception of the last membrane element in the series; each coupling member having an open first end adapted to be secured to the residual end of a membrane element, n open second end adapted to be secured to the feed end of a membrane element and a passage between said first and second ends; and (b) securing the first end of the coupling members to the residual end of each membrane with the optional exception of the last membrane element in the series, and securing the second end of the coupling members to the feed end of the next membrane in the series, if any. The fluid from the residual end of each membrane element in the series except the last may thus be directed to the feed end of the next membrane element in the series. The improvement increases the performance of the fluid separation membrane system by inhibiting the remixing of separated fluids from adjacent membrane stages. The improvement is especially useful in systems where it is important to prevent bypass whereby the feed fluid entering a membrane module could mix without an adequate seal with the residual fluid leaving the module. A series of membrane elements with coupling members secured in place between sequential membrane elements may be sealed within the module as hereinafter described such that the feed to the first membrane element in the series is sealed from the residue from the last membrane element in the series. A preferred use of the improvement is for systems employing nonporous membranes, especially asymmetric nonporous membrane (i.e., those in which there are layers of relatively dense and relatively porous material) to separate gases. Most preferably, the improvement is used in systems where the nonporous membranes are spirally wound.

Figure 1:
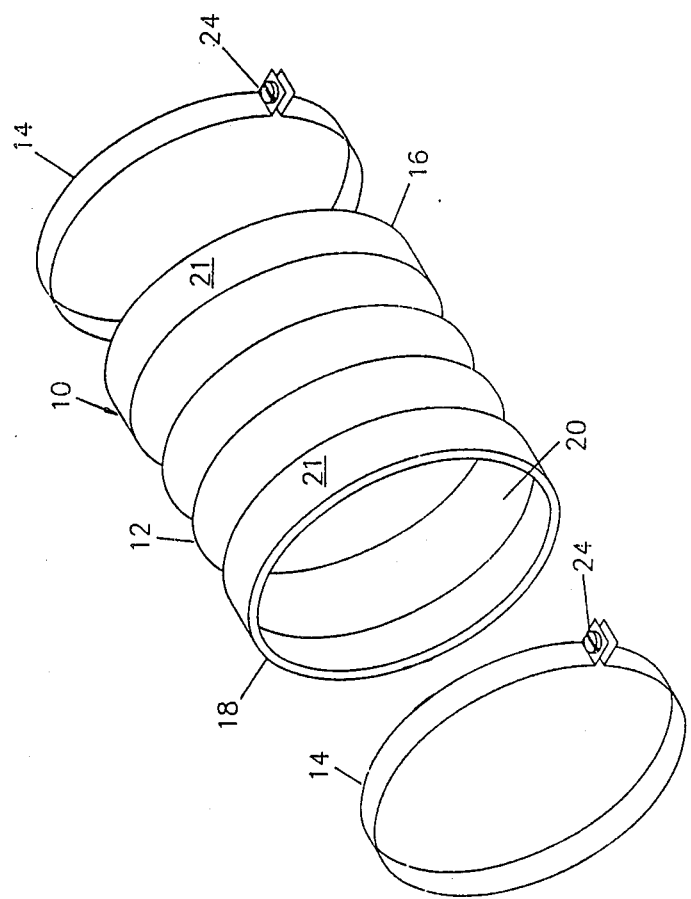
FIG. 1 is an isometric view of a coupling device which may be used in accordance with this invention.

Referring now more particularly to the drawings, wherein like numbers refer to like parts throughout the sectional views, a device for coupling membrane elements in accordance with this invention, is shown generally as (10) in FIG. 1. The device (10) comprises a flexible coupling member (12), and clamps (14). The coupling member (12) has an open first end (16), an open second end (18), and a continuous passage (20)

running from the second end to the first end. The coupling member is designed such that the walls of the passage are essentially impervious to the fluid mixture being treated. The first end (16) and second end (18) are adapted to be secured to membrane elements, and in FIG. 1 are shown with lips (21) which are sized to receive cylindrical end caps provided at the ends of the spiral wound membrane elements illustrated in FIGS. 4 and 6. The clamps (14) Provide a means for securing the respective ends of the coupling member (12) to membrane elements and are sized to slide around the lips (21) when the screws (24) are loosened, and to compress lips (21) as the screws (24) are tightened.

Figure 2:
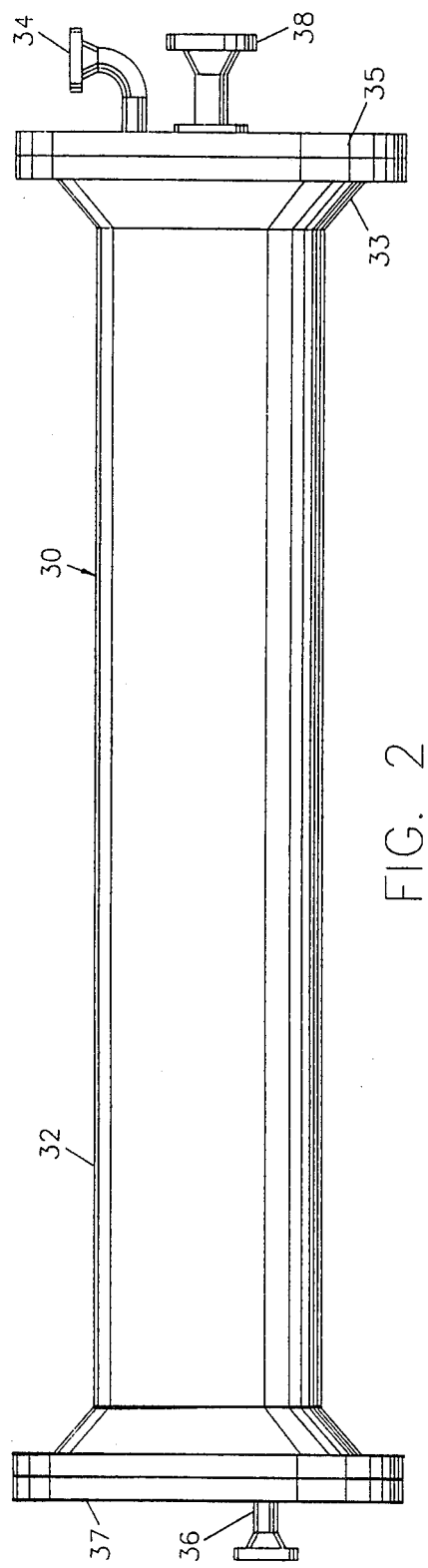
FIG. 2 is an elevational view of an improved fluid separation module of this invention.
Figure 3:
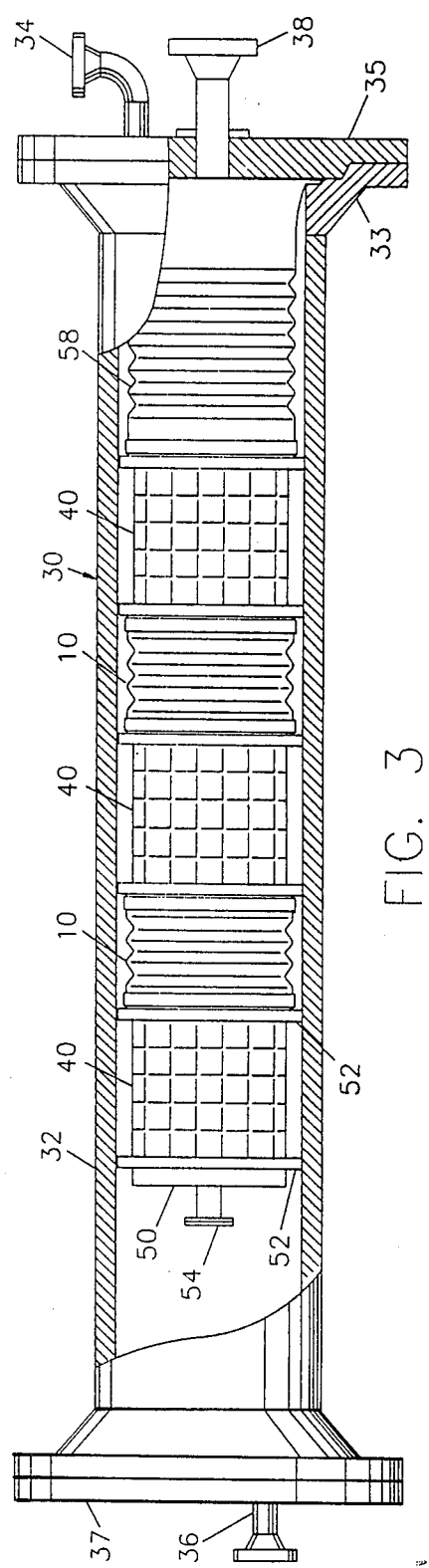
FIG. 3 is a partially sectioned view of the separation module of FIG. 2 showing three membrane elements within the containment vessel coupled in series, in accordance with this invention.

A coupling device such as the device (10), may be advantageously incorporated into gas separation apparatus, particularly modules containing spirally wound membranes, to provide an improved apparatus wherein remixing of gases after separation is inhibited. A preferred embodiment is shown in FIGS. 2 through 6 in more detail. A module (30) is shown in FIG. 2 which comprises a containment vessel (32) having a casing (33), a feed side end plate (35), a residual side end plate (37), a feed gas inlet port (34), a residual outlet port (36), and a permeate outlet port (38). FIG. 3 shows one embodiment for the general internal structure of the module (30). In this embodiment, the module (30) contains three spiral wound membrane elements (40).

As better shown in FIGS. 4 and 6, each membrane element (40) represents a typical unit in which a membrane (48) is spirally wound about a permeate conduit (49) that axially extends from both ends of the wound membrane. The gases enter the feed end (42) of the membrane (48). The gases which pass through each membrane travel to the inward end of the spiral wind whereat they enter the respective permeate conduit (49) through openings therein (not shown). Various known spacing structures, such as Tricot products, are used within the spiral structure to permit the flow of permeate toward the conduit. Such spacing structures consist of a fine mesh material with open channels. The material can be a polypropylene, a polyester, or similar polymeric material. There is also a spacing structure on the feed side of the membrane to permit the flow of gas into and through the spirally wound structure. This feed spacer can also be made of a polymeric material, such as polypropylene. Vexar netting is an example of such a product. Reference is made to U.S. Pat. No. 4,134,742, which is hereby incorporated herein in its entirety, for further description of a spirally wound gas separation element. In any case, this structure allows permeate gas to enter the permeate conduits (49) through the aforementioned holes (not shown) in the permeate tube located within the membrane element. The residual gas from each element exits the residual end (44) of the membrane, and the residual gas from the final membrane in the series passes from the membrane element and may then exit the module (30) through outlet port (36).

In practice the pressure drop across the ends of spirally wound membrane elements (i.e. between the feed gas to the element, and the residual gas therefrom) is relatively small, generally only a few psi, and the feed gas pressure may be considered substantially equivalent to the residual gas pressure when compared to a typical permeate gas pressure. On the other hand, the operating pressure drop from both the feed gas and residual gas streams to the permeate gas stream in gas separation systems is normally at least 10 psi, is generally from 100 psi to 1,200 psi, and in some membrane systems can be up to about 2,100 psi. Both the feed stream and the residual stream are considered to be on the feed side of the membrane, as opposed to the permeate stream which is located on the opposite side of the membrane. Use of the device (10) is further illustrated as follows. As shown in FIG. 4, the device (10) is positioned around the permeate conduits (49) of sequential membrane elements (40), and before the ends (16) and (18) of the coupling member (12) is secured to said membrane elements, the permeate conduits of the sequential membrane elements are connected, as by using the conventional quick-connect pipe clamps shown at (55). The ends (16) and (18) may then be respectively secured to said membrane elements so that the residual end (44) of the membrane is in communication through the passage (20) with the feed end (42) of the other membrane. This process is repeated for the entire series of membrane elements so that the residual end (44) of each membrane in the series except the final one is in communication through a coupling member passage (20) with the feed end (42) of the next membrane in the series. Accordingly, any feed gas to the first membrane element which does not permeate through one of the membranes will alternatively pass through membrane elements and flexible coupling member passages until it exits from the residual end of the final membrane of the series. Accordingly there will be no bypass of membrane elements as the gas passes through the desired number of membrane elements. In the embodiment shown in FIGS. 3 through 6 the membrane ends have end caps (50) with cylindrical hubs (51) and support rims (52); and the lips (21) of the flexible coupling member (12) are fitted about the hubs (51) and are secured to the membrane element (40) using clamps (14).

Figure 8:
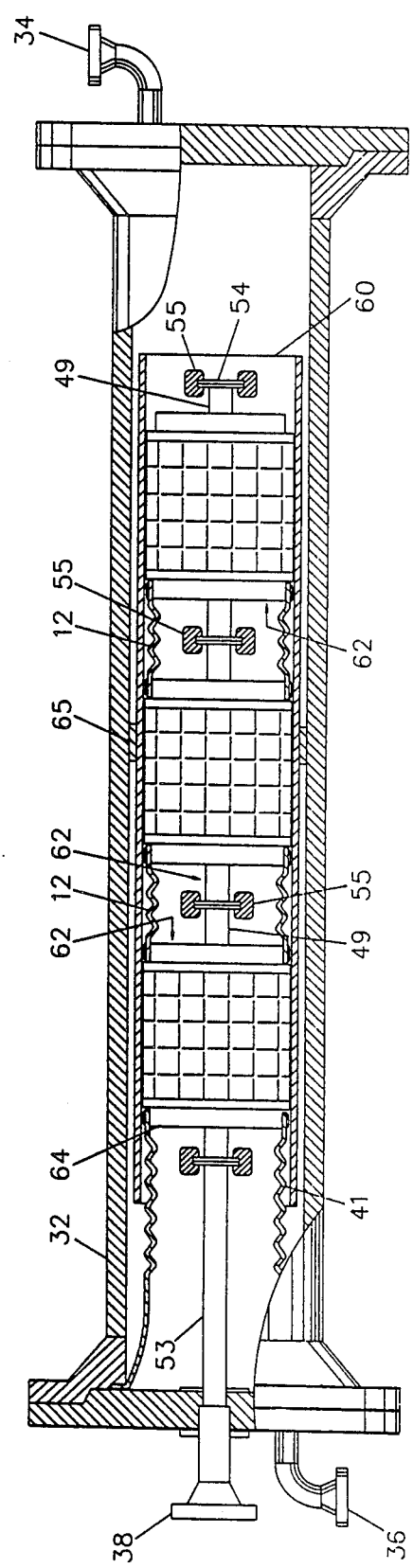
FIG. 8 is a partially sectioned view of a third embodiment of the invention which employs a liner insert within the containment vessel and a flexible residual end coupling.

It will be evident that in appropriately sized containment vessels, from 2 to 6, or even more membrane elements such as that shown at (40) in FIG. 4, each comprising a permeate conduit such as that shown as (49) with a membrane (48) spirally wound thereabout, may be linked in series by sequentially connecting the ends of the permeate conduits (49) as by using the clamps (55). Membrane element support rims such as those shown at (52) in FIGS. 3 and 4 can be provided with each element to support the respective element within the module. Alternatively, a tubular, smooth liner (60) as shown in FIG. 8 can be provided within the containment vessel (32) and sealed therein, such that the several membrane units (62) can be inserted within the liner with their permeate conduits (49) linked in series and their outer surfaces adequately sealed against the inner surface of the liner. Reference is made to U.S. Pat. No. 4,746,430 for a more detailed description of a liner arrangement within a module. However, the embodiment of FIG. 8 herein employs in addition an end coupling (41) to reduce reliance upon the seal (65) between the liner (60) and the containment vessel. For the embodiment shown in FIG. 8, the membrane element end caps (64) are recessed and the coupling members (12) may be secured thereto with clamps. In any case, the forward-most permeate conduit is linked as through tube (53) in FIGS. 4 and 8, with the permeate outlet port (38); and since the permeate conduits are interconnected, only the permeate conduit of the last membrane element in the series need be closed at its end as with a cap such as that shown at (54) or an appropriate relief device (not shown) which is closed under normal operation.

As described above under normal operation, the feed pressure (i.e. the gas pressure of the feed gas inlet port) is somewhat greater than the residual pressure (i.e., the pressure at the residual outlet port). The pressure drop is associated with passage of the gas through the membrane elements (40). There will thus be a tendency for gas to bypass the membrane elements unless satisfactory means are provided to seal the feed gas from the residual gas and to direct the feed gas into and through the series of membrane elements. It will therefore be evident that even when coupling in conformance with this invention is used, there should be provided sealing means for sealing the feed to the first membrane element in the series from the residue from the last membrane element in the series. The sealing means may be of various designs. A preferred sealing means is a flexible feed end coupling such as that shown at (58) in FIGS. 3 and 4 which directs feed gas from the feed gas inlet port (34) to the feed end of the first membrane element in the series. The effectiveness of this type of seal does not depend upon the magnitude of the pressure drop between the feed and residual gases, but can be achieved simply by securing one end of the feed end coupling (58) to the end cap (50) of the first membrane element, and by securing the other end at the feed end coupling (58) at the inlet port (34) (for example, by clamping it between module end plate (35) and module casing (33) as shown in FIGS. 3 and 4. Moreover in this arrangement the fluid which contacts the inside surface of the containment vessel is essentially residual fluid; and thus the permeate is not exposed to the internal surface of the containment vessel, and the containment vessel surface requires less protection from materials which are substantially removed as permeate. This can reduce the amount of finishing which might otherwise be required for said surface.

Figure 7:
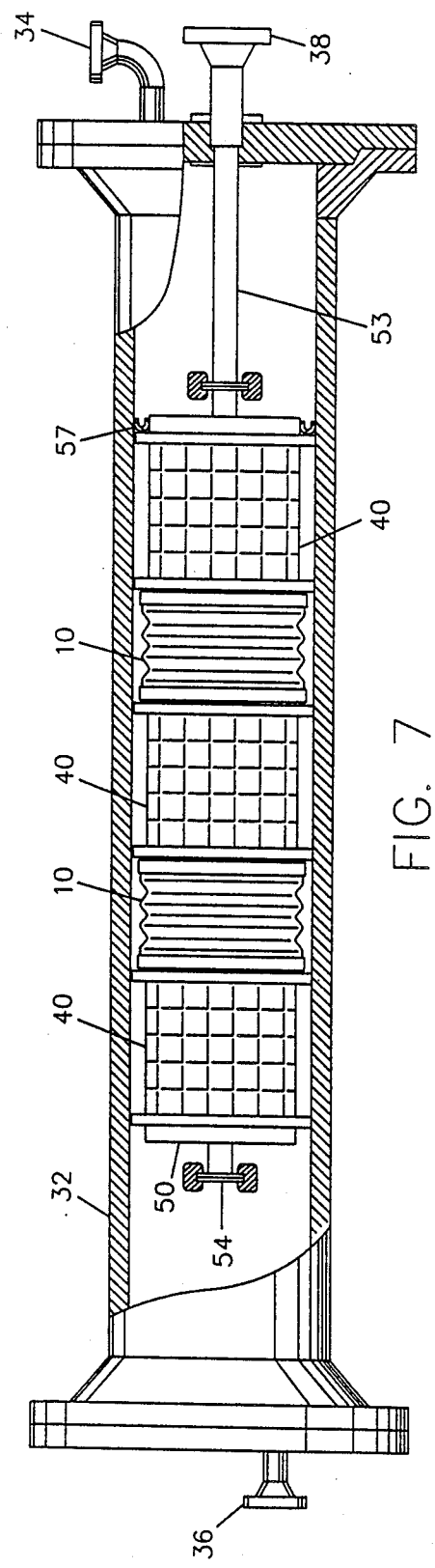
FIG. 7 is a partially sectioned view of a second embodiment of the invention which uses a U-cup seal.

An alternative sealing means is a flexible residual end coupling such as that shown at (41) in FIG. 8 which directs residual gas from the residual end of the last membrane in the series to the residual outlet port (36). Another alternative form of sealing means could for example be a common U-cup seal such as that which might conventionally be used to seal the outer wrap of each membrane element to the inner wall of the containment vessel when the couplings of this invention are not employed. However, as opposed to the conventional practice, only one U-cup seal such as that shown at (57) in FIG. 7 need be employed for the entire series of membrane elements when couplings are used in accordance with this invention. Accordingly the pressure drop across the seal (57) will correspond to the total drop across the series of membrane elements, and the U-cup seal may be expected to seal more firmly under the influence of this increased pressure drop.

In any case an improvement is provided in accordance with this invention to a gas separation module comprising a containment vessel having an inlet port for a feed stream, an outlet port for a residual stream, an outlet port for a permeate stream; and a plurality of spiral wound gas separation elements which include a permeate conduit and a membrane with a feed end and a residual end and which are arranged in series within the containment vessel with their permeate conduits connected in series so as to be in communication with said permeate outlet, the residual end of each membrane element in the series except the last being adjacent to the feed end of the next membrane element; and sealing means for sealing the feed gas to the first membrane element in the series from the residue gas from the last membrane element in the series. The improvement comprises a flexible coupling member between each of said adjacent membrane ends in the series, each of said coupling members having an open first end which is secured to the residual end of each membrane except the last membrane of the series, an open second end secured to the feed end at the next membrane in the series, and a passage between said first and second ends for passing the residual gas from the membrane secured to the first end to the lead end of the next membrane. While an additional flexible coupling member may also be provided at the residual end of the last membrane of the series, it will typically be unnecessary where other means are provided for directing the residual gas from the last membrane in the series to the appropriate outlet port of the containment vessel.

There is also provided in accordance with this invention an improved method of coupling in series the membrane elements of a fluid separation module employing a plurality of membrane elements each of which include a membrane with a feed end and a residual end, such that the residual end of each membrane in the series except the last is paired with the feed end of the next membrane in the series. The improvement comprises the steps of securing to either the residual end or the feed end in each of said paired membrane ends the first end of a flexible coupling member, and securing the secured end of the flexible coupling member to the other of said paired membrane ends so that fluid passing from the residual end of said paired membrane ends is directed through the flexible coupling member passage to the feed end of said Paired membrane ends.

It will be evident that the clamps (14) are not the only means for securing coupling members (12) to membrane elements. Other securing means such as screw connections, glues, adhesive tapes or elastic bands may also function to seal the flexible coupling to the end of the membrane elements.

Membrane elements can be provided in accordance with this invention with a coupling member secured to at least one end of the membrane prior to assembly of the membrane series. An embodiment of such an element is shown at 60 in FIG. 9 wherein the first end (16) of the flexible coupling member (12) is secured, permanently if desired, at one end of the membrane (48) with the permeate conduit (49) extending within the passage (20). It will be evident that the second end (18) of the coupling member may then be secured to the end of another membrane after the permeate conduits of the two membranes are joined within the passage (20).

The flexible coupling member (12) may be made of any flexible material which is essentially impervious to the fluids being treated, and which is otherwise compatible with the module environment. For example VITON, a fluorocarbon polymer available from DuPont, is considered a suitable material for many gas separation applications. Flexibility is of some importance because it allows access to the ends of permeate tubes so that they may be connected by means such as a quick connect pipe clamp (55) while the coupling member is between membrane elements with the permeate tubes therethrough. Clamps (14) and screws (24) may be suitably made of metal such as tin or steel, or polymer materials.

While the invention has been describe above with an emphasis upon gas separation systems, the invention is considered suitable for practice with other fluid separation systems such as those which employ membranes for separating dissolved materials from aqueous solution.

It is understood that the invention is not confined to the particular construction, arrangement of parts, steps, or materials herein illustrated and described, but embraces all such modified forms thereof as come within the scope of the following claims.

What is claimed is:

1. An improved method of coupling in series the membrane elements of a fluid separation module containing a plurality of membrane elements for separating fluids from a fluid mixture, each membrane element having a membrane with a feed end and a residual end, the improvement comprising the steps of:
   (a) providing a flexible coupling member for each membrane element with the optional exception of the last membrane element in the series; each coupling member having an open first end adapted to be secured to the residual end of a membrane element, an open second end adapted to be secured to the feed end of a membrane element and a passage between said first and second ends, the walls of said passage being essentially impervious to the fluid mixture; and
   (b) securing the first end of the coupling members to the residual end of each membrane element with the optional exception of the last membrane element in the series, and securing the second end of the coupling members to the feed end of the next membrane element in the series, if any.

2. The improved method of claim 1 wherein clamps are used for securing the coupling members to the membrane ends.

3. An improved method of coupling in series the membrane elements of a fluid separation module employing a plurality of membrane elements for separating fluids from a fluid mixture each of which membrane elements include a membrane with a feed end and a residual end, such that the residual end of each membrane in the series except the last is paired with the feed end of the next membrane in the series, the improvement comprising the steps of:
   (a) in each of said paired membrane ends, either securing the residual end to the first end of a flexible coupling member comprising an open first end, an open second, and a passage between said first and second ends, the walls of said passage being essentially impervious to the fluid mixture, or securing the feed end to the second end of said flexible coupling member; and
   (b) securing the other end of said coupling member to the other of said paired membrane ends so that fluid passing from the residual end of said paired membrane ends is directed through said passage to the feed end of said paired membrane ends.

4. The improved method of claim 3 wherein in step (a) the coupling member is permanently secured to either the residual end or the feed end of the membrane.

5. An improved gas separation module comprising a containment vessel having an inlet port for a feed stream, an outlet port for a residual stream, an outlet port for a Permeate stream; and a plurality of spiral wound gas separation elements which include a permeate conduit and a membrane with a feed end and a residual end and which are arranged in series within the containment vessel with their permeate conduits connected in series so as to be in communication with said permeate outlet, the residual end of each membrane element in the series except the last being adjacent to the feed end of the next membrane element; and sealing means for sealing the feed gas to the first membrane element in the series from the residue gas from the last membrane element in the series, the improvement comprising:
   a flexible coupling member between each of said adjacent membrane ends in the series, each of said coupling members having an open first end which is secured to the residual end of each membrane except the last membrane of the series, an open second end secured to the feed end at the next membrane in the series, and a passage between said first and second ends for passing the residual gas from the membrane secured to the first end to the feed end of the next membrane, the walls of said passage being essentially impervious to the fluid mixture.

6. The improved gas separation module of claim 5 wherein the sealing means comprises a flexible feed end coupling which directs feed gas from the inlet port to the feed end of the first membrane element in the series.

7. An improved spiral wound membrane element having a membrane which is spirally wound about a permeate conduit that axially extends from both ends of the wound membrane, the improvement comprising a flexible coupling member comprising one open end secured to one end of the membrane, another open end adapted to be secured to the end of another membrane, and a passage between said open ends.

8. The improved spiral wound membrane element of claim 7 wherein the permeate conduit extends within the coupling member passage.

* * * * *